(12) United States Patent
Rosu et al.

(10) Patent No.: US 7,153,202 B2
(45) Date of Patent: Dec. 26, 2006

(54) FLEXIBLE SHAFT DRIVE TRANSMISSION

(75) Inventors: Marinel Rosu, Strongsville, OH (US); Dennis R. Seguin, Elyria, OH (US); Geoffrey D. Rapp, Westlake, OH (US)

(73) Assignee: Bettcher Industries, Inc., Birmingham, OH (US)

( * ) Notice: Subject to any disclaimer, the term of this patent is extended or adjusted under 35 U.S.C. 154(b) by 47 days.

(21) Appl. No.: 11/145,771

(22) Filed: Jun. 6, 2005

(65) Prior Publication Data
US 2006/0019755 A1 Jan. 26, 2006

Related U.S. Application Data

(60) Provisional application No. 60/589,222, filed on Jul. 20, 2004.

(51) Int. Cl.
*A22C 17/02* (2006.01)
*F16C 1/24* (2006.01)

(52) U.S. Cl. .......................................... 452/137; 464/7

(58) Field of Classification Search .................. 452/99, 452/137, 102–105, 132, 135, 149, 164; 464/7, 464/51–53, 170, 173
See application file for complete search history.

(56) References Cited

U.S. PATENT DOCUMENTS

| | | | | |
|---|---|---|---|---|
| 906,113 | A * | 12/1908 | Curtis | 464/52 |
| 1,530,381 | A * | 3/1925 | Leedom | 72/126 |
| 1,678,335 | A * | 7/1928 | Gaston | 464/52 |
| 1,943,980 | A * | 1/1934 | Mall | 464/53 |
| 3,250,088 | A * | 5/1966 | Hanebuth | 464/53 |
| 4,964,839 | A * | 10/1990 | Gloor | 464/29 |
| 5,366,043 | A * | 11/1994 | Kretschmer et al. | 184/5 |
| 5,772,521 | A * | 6/1998 | Herchenbach et al. | 464/170 |
| 6,354,949 | B1 * | 3/2002 | Baris et al. | 464/7 |

* cited by examiner

*Primary Examiner*—Thomas Price
(74) *Attorney, Agent, or Firm*—Tarolli, Sundheim, Covell & Tummino LLP

(57) ABSTRACT

Helical members applied in flexshaft assemblies for retaining lubricant inside a flexshaft casing 22. The helical members have a helix that is opposite of a helix of wires that make up a flexible drive member. The helical members direct the lubricant away from an end of the flexshaft assembly that the helix of wires tends to direct the lubricant toward.

18 Claims, 3 Drawing Sheets

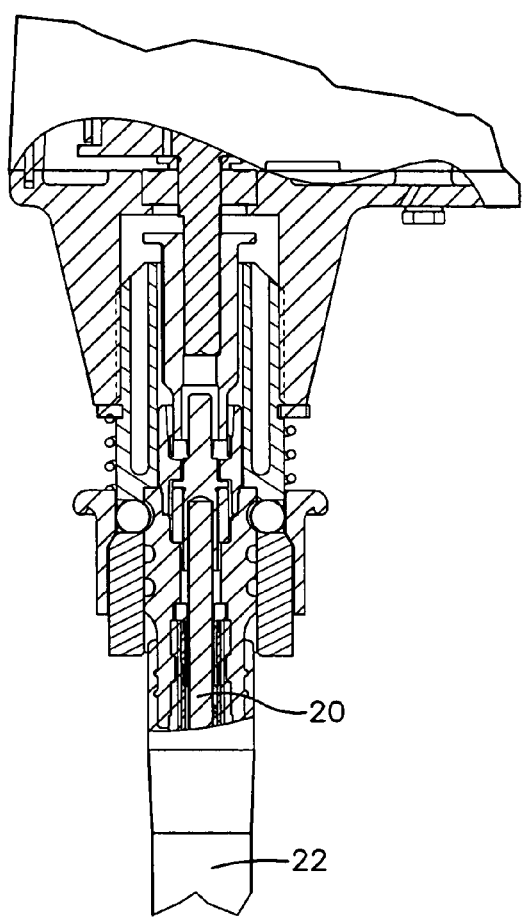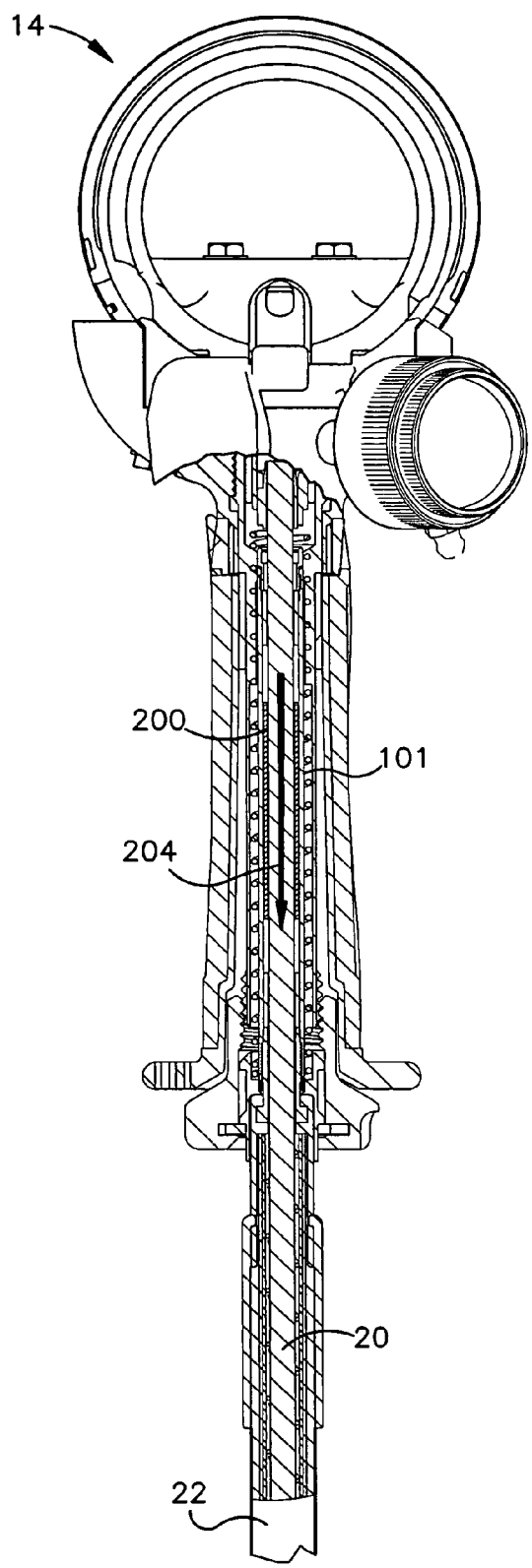
Fig.2
Fig.3

FLEXIBLE SHAFT DRIVE TRANSMISSION

CROSS-REFERENCE TO RELATED APPLICATION

This application claims priority from Provisional Application No. 60/589,222, filed on Jul. 20, 2004. Provisional Application No. 60/589,222 is incorporated herein in its entirety by reference herein.

FIELD OF THE INVENTION

The present invention concerns rotary cutting tools used in meat processing plants.

BACKGROUND ART

Rotary cutting tools 14 are used in meat processing plants. An electric motor 12 is used to power the rotary cutting tool 14. The motor 12 connects to a flexible drive shaft assembly 20 or flexshaft assembly which is coupled to a gear of the rotary cutting tool 14.

One problem with the design of existing flexshaft assemblies 20 is that rotation of the flexshaft assembly within a sealed flexible tubular casing 22 causes lubricant to be forced out of the tubular casing. The flexshaft assembly 20 is comprised of wires wrapped around a core wire. The tubular casing 22 helps protect the flexshaft assembly from the environment and protects workers from the rotating shaft. The wires are wrapped in a direction that causes a screwing effect downward from the motor 12 to the rotary cutting tool 14. This causes the lubricant to be pumped out of the casing 22 as indicated by arrow 23 and reduces the life of the flexshaft assembly 20.

Unsuccessful attempts have been made to prevent the helical wires from pumping the lubricant out of the casing 22. For example, sealing around the flexshaft assembly has been unsuccessful, because there are gaps between the wires that allow the lubricant to escape. One solution was to crimp a metal bearing onto the flexshaft assembly and run the metal bearing inside of a TEFLON bearing. However, this seal is not always 100% effective.

SUMMARY

A disclosed flexible shaft drive transmission has a first end connectable to a drive motor and a second end connectable to a rotary cutting tool. The transmission includes a flexible drive shaft assembly having a flexible elongated drive transmitting member, and a drive coupling fixed to the drive transmitting member at the first end.

A tubular casing surrounds and is coaxial with the drive shaft assembly and supports the drive shaft assembly for rotation generally about a longitudinal axis of said drive shaft assembly relative to the casing. The casing includes a tubular flexible conduit loosely surrounding the drive transmitting member.

A first end fitting is fixed to the conduit adjacent the first end. A second end fitting is fixed to the conduit at the second end. A lubricant is disposed within said casing and an externally threaded bearing is secured around the flexible elongated drive transmitting member so that rotation of the flexible elongated drive transmitting member causes rotation of the bearing. Rotation of the externally threaded bearing forces lubricant toward the first end to prevent leakage of lubricant from the second end. Advantages of the invention in association with this flexible shaft drive transmission are see from an exemplary embodiment which is described in conjunction with the accompanying drawings.

BRIEF DESCRIPTION OF THE DRAWINGS

FIG. 2 is partially section view of a proximal end of the flexible transmission of FIG. 1;

FIG. 3 is a partially section view of the distal end of the flexible transmission of FIG. 1;

EXEMPLARY EMBODIMENT

Two New Ways to Prevent Lubricant Leakage:

I. Reverse Threaded Bearing Attached to Flexshaft.

Figure 5:
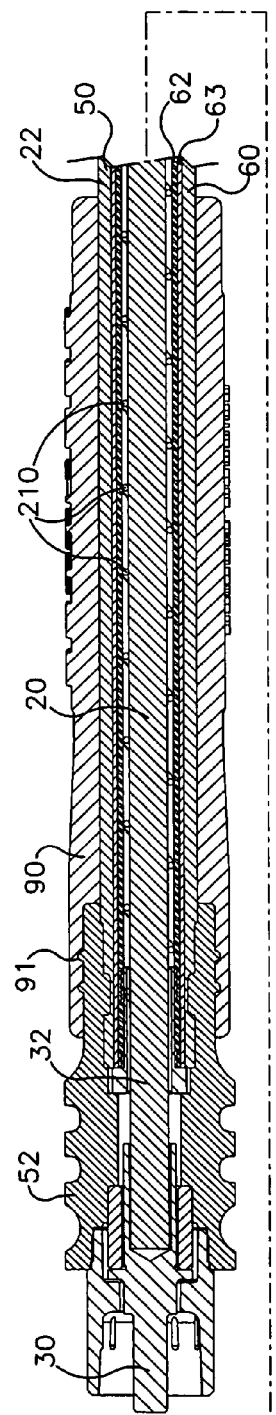
FIG. 5 is a view as seen from the plane of the line 5—5 in FIG. 4.
Figure 6:
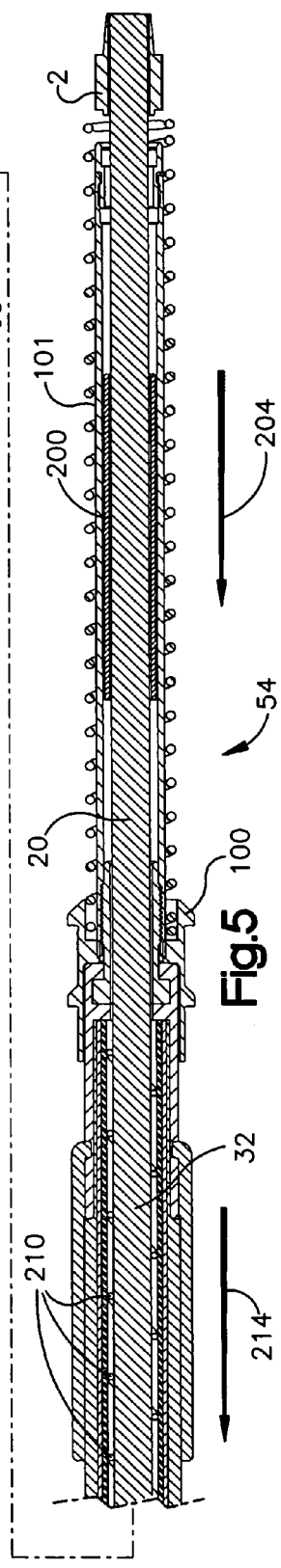
FIG. 6 is a plan view of outer surface of a threaded bearing.

Referring to FIGS. 5 and 6, one new way of retaining lubricant inside the casing 22 is to attach a reverse threaded bearing 200 to the flexshaft assembly. The reverse threaded bearing 200 may be made from plastic and be attached to the flexshaft assembly 20 by molding it in place, by manufacturing a sleeve that fits tightly over the flexshaft and applying heat to cause a shrinking effect, or using an adhesive. When the reverse threaded bearing is applied using heat, the heat causes the reverse threaded bearing 200 to latch onto the flexshaft assembly 20 and fill in any gaps between the flexshaft wires. When adhesive is used, the adhesive fills the gaps between the flexshaft wires. The lubricant can no longer escape through gaps between the flexshaft wires. The outside of the bearing will run against a metal tube, such as the tubular guide part 101 that is inserted into the tool 14. The outside of the bearing 200 includes a raised thread 202 (FIG. 6), in the opposite direction of the helical flexshaft wires, in order to help push the lubricant back up the flexshaft as indicated by arrow 204. The lubricant will thus remain in the casing and retain its effectiveness.

II. Reverse Helical Bearing.

Referring to FIG. 5, a second new way of retaining lubricant inside the casing 22 is to insert a reverse helical bearing (or spring) 210 in the casing 22 around the flexshaft assembly 20. The reverse helical bearing 210 is formed from wire that is round in cross section in the same manner as springs are formed. The helix of the reverse helical bearing 210 is in the opposite direction of the helical flexshaft wires.

When the flexshaft assembly is substantially straight, the reverse helical bearing 210 will tend to rotate with the flexshaft assembly 20 and push the lubricant up the flexshaft as indicated by arrow 214.

When the flexshaft assembly 20 is in a curved configuration (See FIG. 1), the reverse helical bearing 210 will tend not to rotate with the flexshaft. However, windings of the helical bearing will still act as a barrier and inhibit movement of the lubricant down the flex shaft. In addition lubricant will be forced radially outward by the rotating flexshaft against the helical bearing 210 and be directed up the flexshaft by contact with the helical bearing 210.

Figure 1:
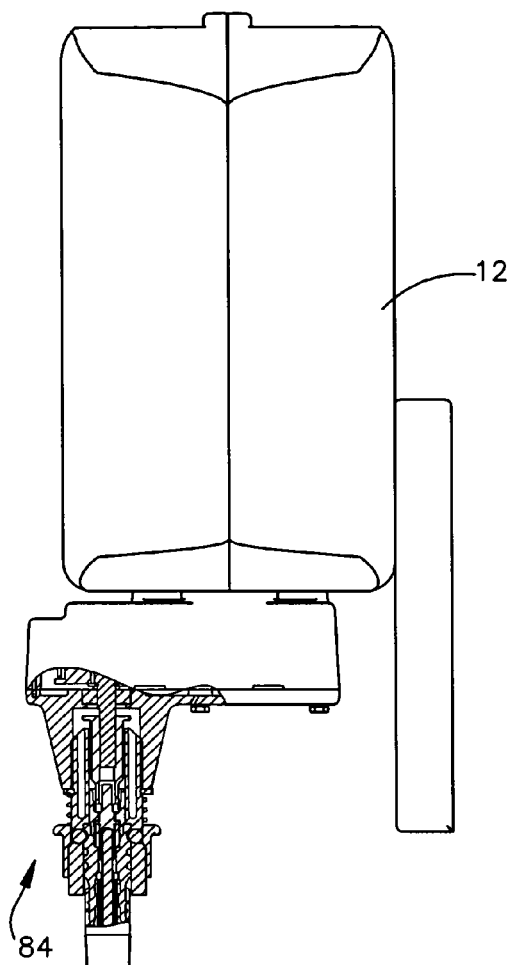
FIG. 1 is a partially section plan view of a flexible drive transmission and rotary knife.
Figure 1:
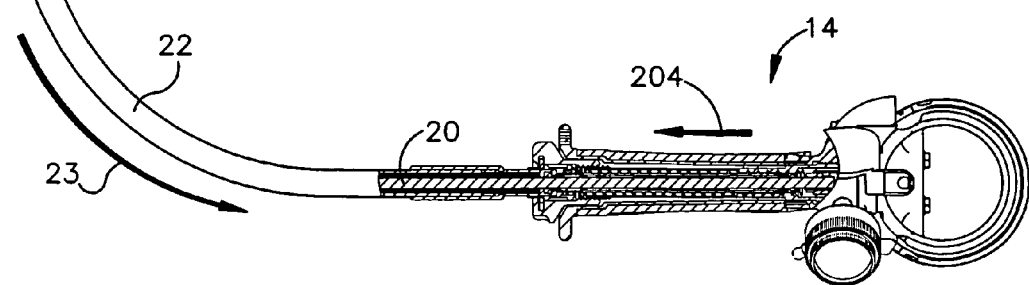
Figure 4:
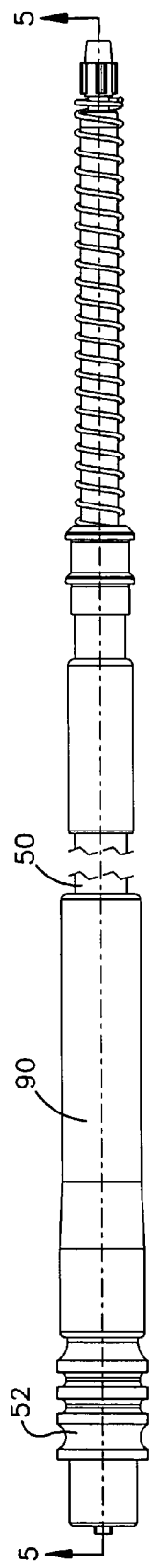
FIG. 4 is a plan view of an end fitting, stress relive sleeve and drive end of the flexible drive transmission.

The illustrated flexible drive shaft transmission is used for transmitting drive from a motor 12 to a power operated tool 14. Referring to FIG. 1, the illustrated flexible shaft drive transmission 10 comprises a flexible drive shaft assembly 20 connectable between the drive motor 12 and the tool 14, a tubular casing 22 surrounding and coaxial with the drive shaft assembly 20, and a relatively viscous lubricant, not illustrated, disposed within the casing. Where the transmission 10 is employed for operating a knife, or other food industry tool, the lubricant is edible.

In the illustration of FIG. 1, the motor 12 is an electric motor that is suspended above a work station. The tool 14 is a rotary knife of the type that is used in the food processing industry for trimming cuts of meat. The knife is manually grasped and drawn across meat at the work station for trimming fat, removing meat from bones, etc. The knife 14 is illustrated as of a conventional, known type and therefore is not illustrated or described in detail. The knife 14 is shown for the purposes of illustration. Different knives and other tools may be used with the transmission 10.

Referring to FIG. 5, the drive shaft assembly 20 comprises a flexible elongated drive transmitting member 32, a drive coupling 30, connectable to the motor and fixed to the drive transmitting member 32 and a drive end portion 2, for operating the knife 14. The illustrated drive transmitting member 32 is a flex shaft composed of wires that are tightly wound into a helix that is capable of transmitting substantial torque yet is flexible so that the knife 14 can be manipulated while drive is transmitted to it.

Referring to FIG. 5, the casing 22 supports the drive shaft assembly 20 for rotation relative to the casing generally about the drive shaft assembly longitudinal axis. The casing 22 comprises a tubular flexible conduit 50 loosely surrounding the drive transmitting shaft 32, a first end fitting 52 fixed to the conduit at the end 16 for connecting the end 16 to the motor 12, and a second end fitting 54 fixed to the conduit at the second end 18 for connecting the opposite end to the knife 14. The shaft 32 is freely rotatable with respect to the conduit 50 and fittings 52, 54.

The conduit 50 is formed by a extruded flexible tubular outer body 60, an inner sheath 62 that loosely surrounds the shaft 32 and a stainless steel braid 63 that is interposed between the outer body and sheath. The illustrated conduit is constructed by braiding stainless steel wires tightly around the sheath 62 and then extruding the outer body over the braid and sheath. The outer body 60 is formed of a plastic material that flows through the braiding and adheres to the sheath. Because of adhesion between the sheath and outer body, and mechanical interconnections between the braid, sheath and body, the conduit elements are bound together and function as a single unit. The body 60 may be formed from PVC, for example, while the sheath is formed from nylon or polyester. The body 60 may be of any suitable or conventional construction and therefore is not described in further detail. The conduit is produced in significant length and stored in coil form. When fabricating a transmission 10, the conduit is cut to length and its ends are machined appropriately for receiving the end fittings 52, 54.

In the exemplary embodiment, a reverse helical bearing (or spring) 210 is inserted in the casing 22 around the flexshaft assembly 20 to inhibit lubricant leakage. The reverse helical bearing 210 is formed from round wire. The helix of the reverse helical bearing 210 is in the opposite direction of the helical flexshaft wires.

When the flexshaft assembly is substantially straight, the reverse helical bearing 210 will tend to rotate with the flexshaft assembly 20 and push the lubricant up the flexshaft as indicated by arrow 214.

When the flexshaft assembly 20 is in a curved configuration (See FIG. 1), the reverse helical bearing 210 will tend not to rotate with the flexshaft. However, windings of the helical bearing will still act as a barrier and inhibit movement of the lubricant down the flex shaft. In addition lubricant will be forced against the helical bearing 210 by the rotating flexshaft assembly 20 and be directed up the flexshaft by the helical bearing 210.

In the illustrated embodiment of the invention, a stress relief sleeve 90 surrounds the conduit 50 at the motor end 16 so that excessive flex shaft bending immediately adjacent the motor is avoided. The sleeve 90 is molded over the fitting member 64 and the conduit 50. The fitting member 64 is illustrated as provided with external annular ridges 91 that assist in securing the sleeve 90 in place. The illustrated sleeve 90 is formed from a thermoplastic olefin material, but it could be of any suitable flexible resin.

When the knife 14 is to be operated, the operator grasps the end fitting 52 and inserts the end 16 into a receiving opening in the motor housing. The receiving opening is illustrated as surrounded by a quick release type detent mechanism 84 that is shown in FIG. 1. The illustrated detent mechanism may be of any conventional or suitable construction.

The end fitting 54 is disposed at the transmission end 18 and comprises a fitting member 100 and a tubular guide part 101. In the exemplary embodiment, a reverse threaded bearing 200 is disposed around the flexible shaft assembly in the tubular guide part 101. The reverse threaded bearing 200 may be made from plastic and be attached to the flexshaft assembly 20 by molding it in place, by manufacturing a sleeve that fits tightly over the flexshaft and applying heat to cause a shrinking effect, or using an adhesive. When the reverse threaded bearing is applied using heat, the heat causes the reverse threaded bearing 200 to latch onto the flexshaft assembly 20 and fill in any gaps between the flexshaft wires. When adhesive is used, the adhesive fills the gaps between the flexshaft wires. The lubricant can no longer escape through gaps between the flexshaft wires. The outside of the bearing will bear against the tubular guide part 101. The outside of the bearing 200 includes a raised thread 202 (FIG. 6), in the opposite direction of the helical flexshaft wires, in order to help push the lubricant back up the flexshaft as indicated by arrow 204. The lubricant will thus remain in the casing and retain its effectiveness.

While an exemplary embodiment of the disclosed invention is described with a degree of particularity, it is the intent that the invention include all modifications and alterations from the disclosed design falling within the spirit or scope of the appended claims.

The invention claimed is:

1. A flexible shaft drive transmission having a first end connectable to a drive motor and a second end connectable to a rotary cutting tool, said transmission comprising:
   a. a flexible drive shaft assembly comprising a flexible elongated drive transmitting member, and a drive coupling fixed to said drive transmitting member at said first end;
   b. a tubular casing surrounding and coaxial with said drive shaft assembly and supporting said drive shaft assembly for rotation generally about a longitudinal axis of said drive shaft assembly relative to said casing, said casing comprising a tubular flexible conduit loosely surrounding said drive transmitting member;
   c. a first end fitting fixed to said conduit adjacent said first end;
   d. a second end fitting fixed to said conduit at said second end;
   e. a lubricant disposed within said casing; and f. an externally threaded bearing secured around the flexible elongated drive transmitting member such that rotation of the flexible elongated drive transmitting member causes rotation of the bearing, wherein rotation of the externally threaded bearing forces lubricant toward said first end to prevent leakage of lubricant from the second end.

2. The flexible shaft drive transmission of claim 1 wherein the flexible elongated drive transmitting member comprises wires wrapped around a core wire and wherein assembly of the externally threaded bearing member to the flexible elongated drive transmitting member fills gaps between the wires.

3. The flexible shaft drive transmission of claim 2 wherein the externally threaded bearing member is assembled to the flexible elongated drive transmitting member using heat and wherein material of the externally threaded bearing member fills gaps between the wires.

4. The flexible shaft drive transmission of claim 2 wherein the externally threaded bearing member is assembled to the flexible elongated drive transmitting member using an adhesive that fills gaps between the wires.

5. The flexible shaft drive transmission of claim 1 wherein the externally threaded bearing member is disposed in the second end fitting.

6. The flexible shaft drive transmission of claim 1 wherein the second end fitting includes a tubular guide part and the externally threaded bearing member is disposed in the tubular guide part.

7. The flexible shaft drive transmission of claim 1 wherein the flexible elongated drive transmitting member comprises wires wrapped around a core wire and wherein threads of the externally threaded bearing spiral in an opposite direction as compared to the wires wrapped around the core wire.

8. A method of inhibiting lubricant leakage from a flexible shaft drive transmission having a first end connectable to a drive motor and a second end connectable to a rotary cutting tool, comprising:
   a) securing an externally threaded bearing around a flexible elongated drive transmitting member;
   b) installing the flexible elongated drive transmitting member and the externally threaded bearing into a tubular casing;
   c) rotating the flexible elongated drive transmitting member within the tubular casing, wherein rotation of the externally threaded bearing forces lubricant toward said first end to prevent leakage of lubricant from the second end.

9. The method of claim 8 further comprising filling gaps between wires of the flexible elongated drive transmitting member.

10. A flexible shaft drive transmission having a first end connectable to a drive motor and a second end connectable to a rotary cutting tool, said transmission comprising:
   a. a flexible drive shaft assembly comprising a flexible elongated drive transmitting member, and a drive coupling fixed to said drive transmitting member at said first end;
   b. a tubular casing surrounding and coaxial with said drive shaft assembly and supporting said drive shaft assembly for rotation generally about a longitudinal axis of said drive shaft assembly relative to said casing, said casing comprising a tubular flexible conduit loosely surrounding said drive transmitting member;
   c. a first end fitting fixed to said conduit adjacent said first end;
   d. a second end fitting fixed to said conduit at said second end;
   e. a lubricant disposed within said casing; and
   f. a helical bearing disposed around the flexible elongated drive transmitting member such that co-action between the flexible elongated drive transmitting member and the helical bearing when the flexible elongated drive transmitting member is rotated forces lubricant toward said first end to prevent leakage of lubricant from the second end.

11. The flexible shaft drive transmission of claim 10 wherein the helical bearing is an elongated spring.

12. The flexible shaft drive transmission of claim 10 wherein the helical bearing is an elongated wire having a circular cross-section bent into a helix.

13. The flexible shaft drive transmission of claim 10 wherein the flexible elongated drive transmitting member comprises wires wrapped around a core wire and wherein a helix of the helical bearing is in an opposite direction of a helix of the wires wrapped around the core wire.

14. The flexible shaft drive transmission of claim 10 wherein rotation of the flexible elongated drive transmitting member causes rotation of the helical bearing when the tubular casing is substantially straight and rotation of the helical bearing forces lubricant toward said first end.

15. The flexible shaft drive transmission of claim 10 wherein rotation of the helical bearing is inhibited when the tubular casing is bent and when so inhibited rotation of the flexible elongated drive transmitting member directs lubricant into contact with the helical bearing which directs lubricant toward said first end.

16. A method of inhibiting lubricant leakage from a flexible shaft drive transmission having a first end connectable to a drive motor and a second end connectable to a rotary cutting tool, comprising:
   a) installing an elongated a helical bearing around a flexible elongated drive transmitting member;
   b) installing the flexible elongated drive transmitting member and the externally threaded bearing into a tubular casing;
   c) rotating the flexible elongated drive transmitting member within the tubular casing, wherein co-action between the flexible elongated drive transmitting member and the helical bearing when the flexible elongated drive transmitting member is rotated forces lubricant toward said first end to prevent leakage of lubricant from the second end.

17. The method of claim 16 wherein rotation of the flexible elongated drive transmitting member causes rotation of the helical bearing when the tubular casing is substantially straight and rotation of the helical bearing forces lubricant toward said first end.

18. The method of claim 16 wherein rotation of the helical bearing is inhibited when the tubular casing is bent and rotation of the flexible elongated drive transmitting member directs lubricant into contact with the helical bearing which directs lubricant toward said first end.

* * * * *